US012584529B2

(12) United States Patent
Slattery

(10) Patent No.: US 12,584,529 B2
(45) Date of Patent: Mar. 24, 2026

(54) BORONIZED BRAKE DISC ROTOR

(71) Applicant: GM Global Technology Operations LLC, Detroit, MI (US)

(72) Inventor: Benjamin Everest Slattery, Tecumseh (CA)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 390 days.

(21) Appl. No.: 18/342,902

(22) Filed: Jun. 28, 2023

(65) Prior Publication Data

US 2025/0003462 A1 Jan. 2, 2025

(51) Int. Cl.
| | |
|---|---|
| *F16D 65/12* | (2006.01) |
| *F16D 65/10* | (2006.01) |
| *F16D 69/02* | (2006.01) |
| *B60T 13/14* | (2006.01) |
| *F16D 65/18* | (2006.01) |

(52) U.S. Cl.
CPC ........... *F16D 65/127* (2013.01); *F16D 65/10* (2013.01); *F16D 65/125* (2013.01); *F16D 69/02* (2013.01); *B60T 13/142* (2013.01); *F16D 65/18* (2013.01); *F16D 2200/0013* (2013.01)

(58) Field of Classification Search
CPC .......... F16D 65/10; F16D 65/12; F16D 65/18; F16D 65/123–127; F16D 69/02; F16D 2200/0013; B60T 13/142
USPC ..................................................... 188/218 XL
See application file for complete search history.

(56) References Cited

U.S. PATENT DOCUMENTS

| | | | |
|---|---|---|---|
| 3,738,463 | A | 6/1973 | Kunst et al. |
| 6,245,162 | B1 | 6/2001 | Baudis et al. |
| 10,197,121 | B2 * | 2/2019 | Filip ...................... F16D 65/127 |
| 2010/0258394 | A1 * | 10/2010 | Hanna ...................... F16D 65/12 |
| | | | 29/894 |
| 2011/0293849 | A1 | 12/2011 | Lembach et al. |

FOREIGN PATENT DOCUMENTS

| | | | | |
|---|---|---|---|---|
| CA | 2998048 A1 * | 9/2018 | ............... | C23C 8/68 |
| DE | 2006540 A | 8/1971 | | |
| DE | 19830654 A1 | 6/2002 | | |
| DE | 102009008114 A1 | 8/2010 | | |
| DE | 102019202477 A1 * | 8/2020 | ......... | F16D 69/0408 |
| EP | 1752678 A2 * | 2/2007 | ............... | C23C 4/00 |
| KR | 20220136051 A * | 10/2022 | ............... | C23C 8/34 |

OTHER PUBLICATIONS

Rabe, A., et al. U.S. Appl. No. 18/175,261, filed Feb. 27, 2023.

(Continued)

*Primary Examiner* — Christopher P Schwartz
(74) *Attorney, Agent, or Firm* — Vivacqua Crane, PLLC

(57) ABSTRACT

A brake rotor, a brake system including a brake rotor, and a method of boronizing a brake rotor, wherein the brake rotor includes a rotor body including a braking surface. The rotor body includes an iron alloy and the braking surface includes a layer of $Fe_2B$ phases in the braking surface. The brake system includes the brake rotor and a brake pad engageable with the braking surface. The method includes boronizing the braking surface and forming a $Fe_2B$ phases on the braking surface and cooling the rotor body to ambient temperature.

20 Claims, 4 Drawing Sheets

(56) References Cited

OTHER PUBLICATIONS

Capudean, B. "Metallurgy Matters: Phases, structures, and the influences of temperature", The Welder, <<https://www.thefabricator.com/thewelder/article/metalsmaterials/phases-structures-and-the-influences-of-temperature>>, accessed Jun. 26, 2023.

Dawson, Dr. S. "Compacted Graphite Iron: Mechanical Physical Properties for Engine Design", <<https://old.foundrygate.com/upload/artigos/Compacted%20Graphite%20Iron%20-%20Mechanical%20and%20Physical%20Properties%20for%20Engine%20Design.pdf>>, Dec. 12, 2012.

Dey, A. "What is Ductile Iron? Types, Properties, and Applications of Ductile Iron," <<https://whatispiping.com/ductile-iron/>>, accessed Jun. 20, 2023.

Herring, D. "Heat Treatment of Cast Irons", Industrial Heating, <<https://www.industrialheating.com/articles/94644-heat-treatment-of-cast-irons>>, Dec. 12, 2012.

United States Patent and Trademark Office, U.S. Appl. No. 18/175,261, filed Feb. 27, 2023.

Wilk-Kolodziejczyk, D., et al. "Comparative analysis of the properties of the nodular cast iron with carbides and the austempered ductile iron with use of the machine learning and the support vector machine", Int. J. Adv. Manuf. Technol., vol. 87, pp. 1077-1093 (2016).

Zimmerman, C., and Bugliarello-Wondrich, N. "Deep Case Boriding for Extreme Wear Resistance", Heat Treating Society ASM Int'l, vol. 2, Issue 4, 41-44 (Nov.-Dec. 2014).

\* cited by examiner

BORONIZED BRAKE DISC ROTOR

INTRODUCTION

Vehicle brakes utilize friction to stop the wheels from turning and bring the vehicle to a halt. As the brake pedal is depressed or the brake is otherwise actuated, hydraulic pressure is applied to one or more brake pads associated with a given wheel. The brake pads are pressed against a rotor connected to each wheel, causing the rotation of the wheel to slow and eventually halt. During this process, kinetic energy is converted to heat energy, which may result in relatively high local temperatures on the rotor. The contact between the brake pads and the rotor causes material loss in both the brake pads and the rotor, and formation of particulates. Depending on the composition, as some rotors wear, they create track patterns or grooves in the pad or rotor.

Thus, while brake pads and disc rotors have achieved their intended purpose, room remains for further development.

SUMMARY

According to several aspects, the present disclosure is directed to a brake rotor. The brake rotor includes a rotor body including a braking surface. The rotor body includes an iron alloy and the braking surface includes a layer of iron boride phases having the formula $Fe_2B$ ($Fe_2B$ phases) in the braking surface.

In embodiments of the above, the iron alloy includes gray cast iron.

In any of the above embodiments, the layer further includes iron boride phases having the formula FeB (FeB phases). Alternatively, the iron boride phases in the layer consists of $Fe_2B$ phases.

In any of the above embodiments, the braking surface exhibits a hardness in the range of 1500 to 2000 Vickers hardness (HV).

In any of the above embodiments the depth of the layer is in the range of 0.02 millimeters to 2.5 millimeters.

In any of the above embodiments, the rotor body is a disc and includes a central hub and an annulus defined around the central hub, wherein the annulus includes the braking surface. In further embodiments, the annulus includes cast iron. In additional embodiments, the central hub is formed from a second material.

In any of the above embodiments, the rotor body is a drum including a central hub and a wall extending from the central hub, wherein an interior surface of the wall includes the braking surface.

According to several additional aspects, the present disclosure is directed to a brake system. The brake system includes a brake rotor according to any of the embodiments in the above. The brake rotor includes a rotor body including a braking surface. The rotor body includes an iron alloy and the braking surface includes a layer of iron boride phases having the formula $Fe_2B$ ($Fe_2B$ phases). The brake system further includes a brake pad engageable with the braking surface.

In embodiments of the above, the layer further includes iron boride having the formula FeB (FeB phases). Alternatively, the iron boride phases in the layer consist of $Fe_2B$ phases.

In any of the above embodiments, the braking braking surface exhibits a hardness in the range of 1500 to 2000 Vickers Hardness (HV).

In any of the above embodiments, the iron alloy includes gray cast iron.

In any of the above embodiments, the rotor body is a disc. Alternatively, in any of the above embodiments, the rotor body is a drum.

In any of the above embodiments, the brake system further includes a brake actuator, a master cylinder connected to the brake actuator, and a piston connected to the brake pad and the master cylinder, wherein the piston is connected to the master cylinder with one or more hydraulic lines.

According to several additional aspects, the present disclosure is directed to method of forming a brake disc rotor. The method includes removing contamination from a brake rotor. The brake rotor includes a rotor body including a braking surface. The rotor body includes an iron alloy. The method further includes boronizing the braking surface and forming a layer of iron boride phases having the formula $Fe_2B$ ($Fe_2B$ phases) on the braking surface, and cooling the rotor body to ambient temperature.

In embodiments of the above, boronizing includes contacting the iron alloy with a boron containing composition, wherein the iron alloy is exposed to temperature in the range of 700° C. to 1000° C.

In further embodiments of the above, the method includes mechanically finishing the braking surface after boronizing.

In any of the above embodiments, the layer further includes iron boride phases having the formula FeB (FeB phases). In further embodiments, the method includes removing the FeB phases from the braking surface.

In any of the above embodiments, the brake rotor further comprises a central hub and an annulus defined around the central hub, wherein the annulus includes the braking surface. The method further comprises assembling the central hub with the annulus.

BRIEF DESCRIPTION

The drawings described herein are for illustration purposes only and are not intended to limit the scope of the present disclosure in any way.

DETAILED DESCRIPTION

Figure 1:
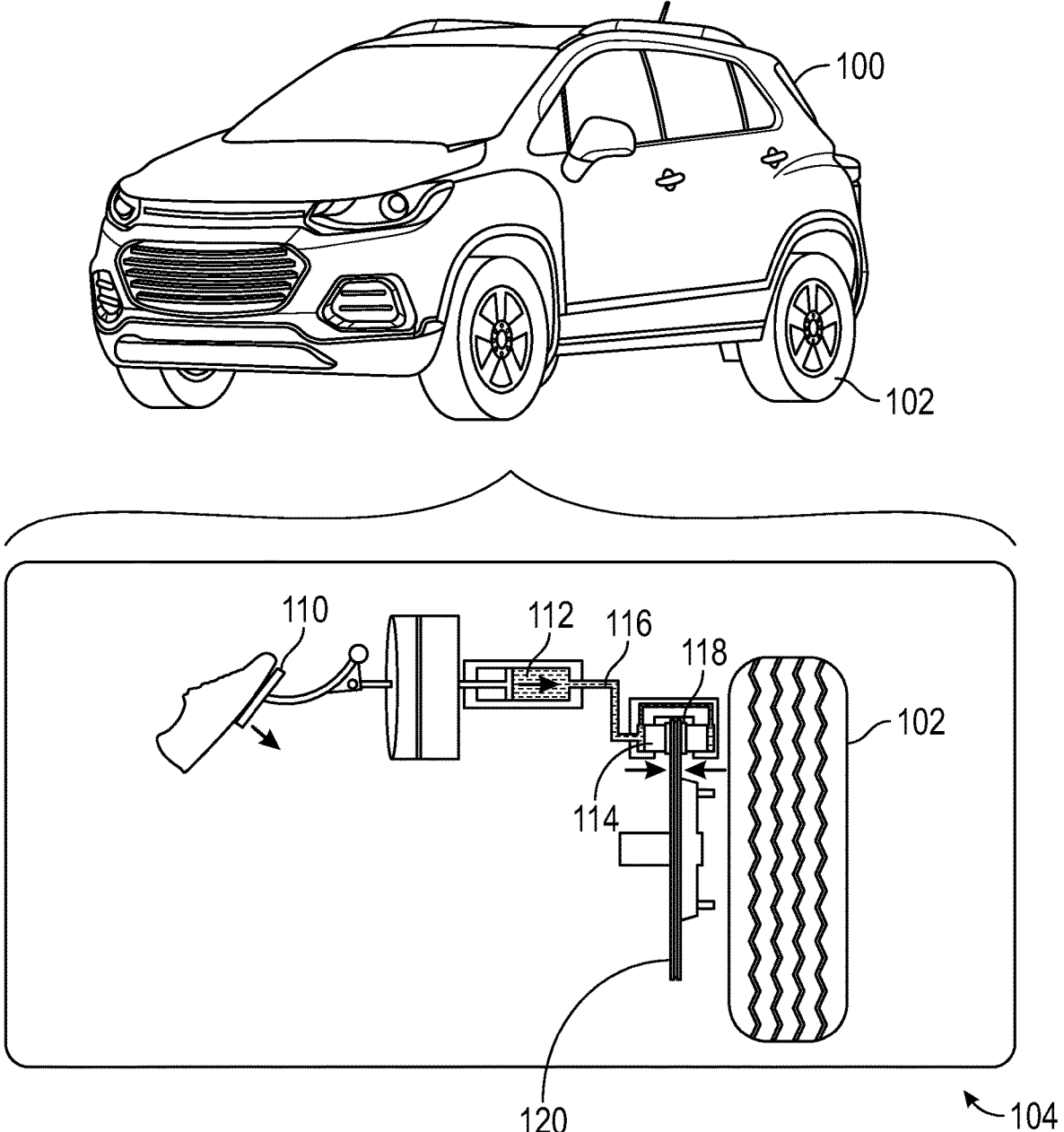
FIG. 1 is a schematic illustration of a vehicle including a brake system according to an embodiment of the present disclosure.

The following description is merely exemplary in nature and is not intended to limit the present disclosure, application, or uses. Furthermore, there is no intention to be bound by any expressed or implied theory present in the preceding introduction, summary, or the following detailed description. It should be understood that through the drawings, corresponding reference numerals indicate like or corresponding parts and features.

While the present technology is described primarily herein in connection with passenger vehicles, the technology is not limited to passenger vehicles. The concepts can be used in a wide variety of applications, such as in connection with commercial vehicles, off-highway vehicles, military vehicles, motorcycles, mopeds, locomotives, aircraft, marine craft, and other vehicles, as well as in other applications where disc rotors may be incorporated, such as in industrial applications including conveyors, indexers, wind turbines, and hose reels.

Reference will now be made in detail to several examples of the disclosure illustrated in the accompanying drawings. Whenever possible, the same or similar reference numerals are used in the drawings and the description to refer to the same or like parts or steps. The drawings are in simplified form and are not to precise scale.

The present disclosure is directed to boronized brake rotors, boronized brake rotor systems, and methods of boronizing the brake rotors. FIG. 1 illustrates a vehicle 100 including four wheels 102. Associated with one or more wheels 102 is a braking system 104. The braking system 104 generally includes a brake actuator 110, such as a brake pedal or an electronic brake actuator. The brake actuator 110 is connected to the master cylinder 112. The master cylinder 112 is connected to pistons 114 or wheel cylinders (see FIG. 4) associated with each wheel 102 by hydraulic lines 116. The pistons 114, or wheel cylinders, are connected to the brake pads 118, which are engageable with the brake rotors 120 connected to each wheel 102 when actuated by the brake actuator 110. The illustrated brake rotor 120 is a disc rotor; however, a drum rotor may alternatively be used (see FIG. 4).

Actuating the brake actuator 110, such as depressing the brake pedal or engaging an electronic brake actuator, generates pressure in the master cylinder 112. The pressure is transmitted hydraulically through hydraulic lines 116 to a piston 114, such as a disc brake piston or a wheel brake cylinder (in the case of drum brakes), associated with each brake system 104 and brake rotor 120. The pressure causes the pistons 114 to expand and the brake pads 118 to engage and apply a force against the brake rotor 120. The force slows the rotation of the brake rotor 120 and wheel 102 to which it is connected, eventually halting the rotation of the wheel 102.

Figure 2:
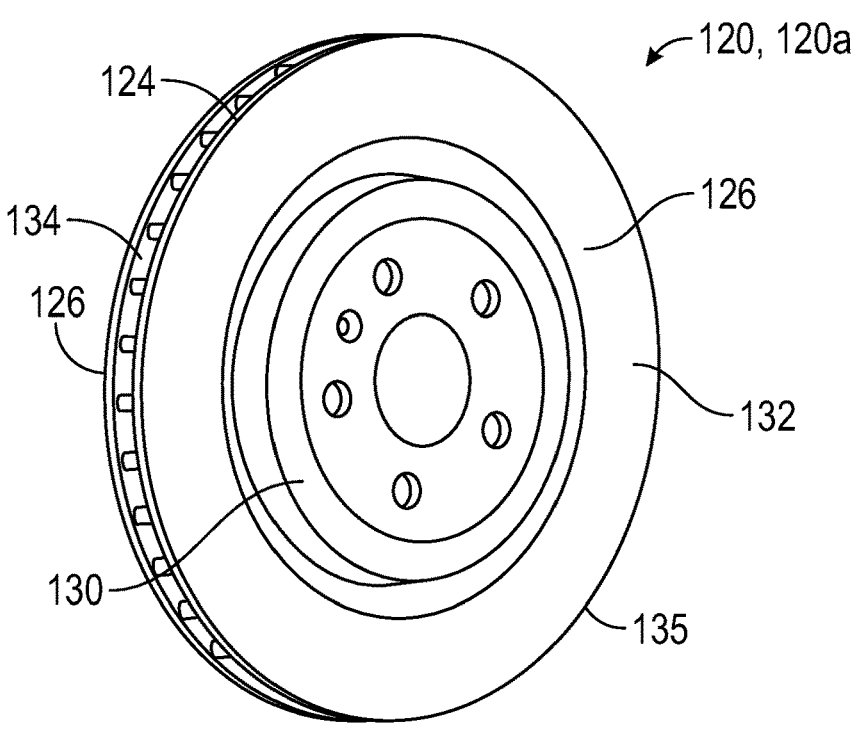
FIG. 2 is an illustration of a disc rotor according to an embodiment of the present disclosure.

FIG. 2 illustrates a brake rotor 120 and, specifically, a disc brake rotor 120a. The disc brake rotor 120a includes a rotor body 124, which includes one or more braking surfaces 126 defining an annulus 132 on the rotor body 124 around a central hub 130. The central hub 130 being a circular hat or bell shape. While only a first braking surface 126 is illustrated in FIG. 2, a second braking surface 126 is present on the opposite side of the rotor body 124. The braking surface 126 may have a surface finish that varies 2 micrometers or less, such as in the range of 0.3 micrometers to 2 micrometers.

The rotor body 124 is formed from cast iron, which is an iron alloy that contains from 2 percent by weight to 4 percent by weight carbon of the total weight of the cast iron alloy along with 1 percent by weight to 3 percent by weight silicon of the total weight of the cast iron alloy. In embodiments, the cast iron is gray cast iron and carbon is present the form of graphite. The cast iron may also contain less than 1.0 percent by weight of the total weight of the cast iron alloy manganese, such as in the range of 0.5 percent to 0.9 percent as well as trace amounts of sulfur and phosphorous impurities, also at less than 0.3 percent by weight of the total weight of the alloy. It is noted that the total weight of the cast iron alloy is 100 percent weight. Alternatively, the rotor body 124 may be formed from one or more alternative iron alloys such as compact graphitic iron (CGI), ductile iron (nodular iron), and steel.

Figure 3:
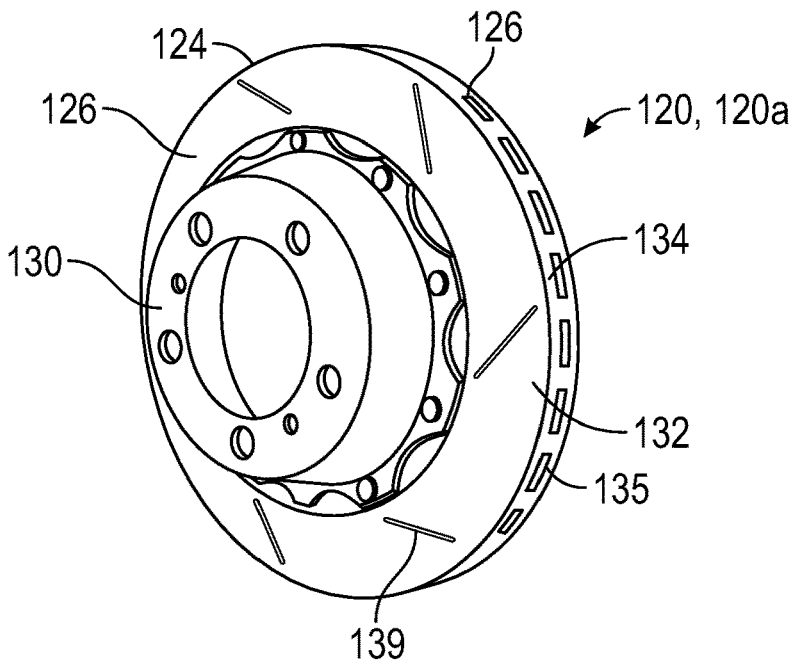
FIG. 3 is an illustration of a disc rotor according to an additional embodiment of the present disclosure.

FIG. 3 illustrates a brake rotor 120, also a disc brake rotor 120a, in which the central hub 130 and surrounding annulus 132 of the rotor body 124 are formed from two separate components instead of a single component. In aspects, the central hub 130 is formed from a second material, including one or more metals, metal alloys, and ceramics. In embodiments, the central hub is formed of aluminum or an aluminum alloy and the annulus 132 surrounding the central hub 130 is formed from cast iron or an alternative iron alloy as described above. The central hub 130 is connected to the annulus 132 by one or more mechanical fasteners or fittings.

Further, the annulus 132 of the rotor body 124 may include a plurality of vents 134 extending from the center of the rotor body 124 to the edges 135 of the disc brake rotor 120a as illustrated in FIGS. 2 and 3, or through-bores defined between the braking surfaces 126 (not illustrated). In addition, the annulus 132 of the rotor body may include grooves 139 in the braking surfaces 126 (as illustrated in FIG. 3) or through holes defined in and extending through the rotor body 124 from braking surface 126 to the opposing braking surface.

Figure 4:
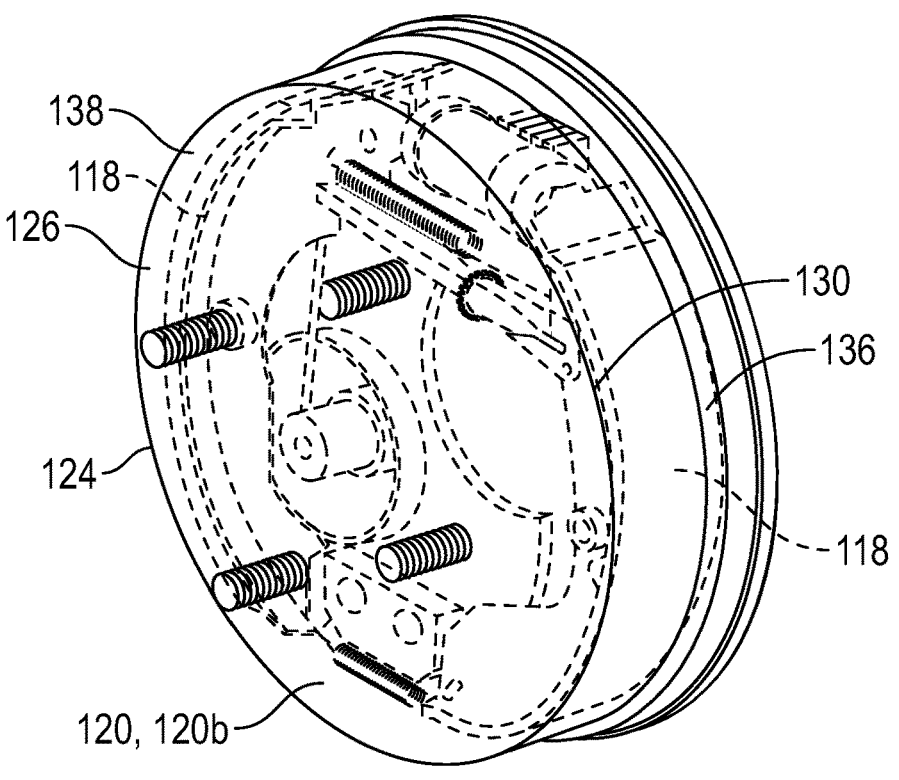
FIG. 4 is an illustration of a drum rotor according to an embodiment of the present disclosure.

FIG. 4 illustrates an embodiment of a brake rotor 120 and, specifically, a drum brake rotor 120b. The drum brake rotor 120b includes a rotor body 124 in the general form of a drum including a center hub 130 and a wall 136 extending from the center hub 130. At least a portion of the inner surface 138 of the wall 136 includes the braking surface 126. As with a disc brake rotor 120a, the rotor body 124 is formed from cast iron, which is an iron alloy that contains from 2 percent by weight to 4 percent by weight carbon along with 1 percent by weight to 3 percent by weight silicon. In embodiments, the cast iron is gray cast iron and carbon is present the form of graphite. The cast iron may also contain less than 1.0 percent by weight manganese, such as in the range of 0.5 percent to 0.9 percent as well as trace amounts of sulfur and phosphorous impurities, also at less than 0.3 percent by weight. Alternatively, the rotor body 124 may be formed from one or more alternative iron alloys such as compact graphitic iron (CGI), ductile iron (Nodular Iron), and steel.

Figure 5:
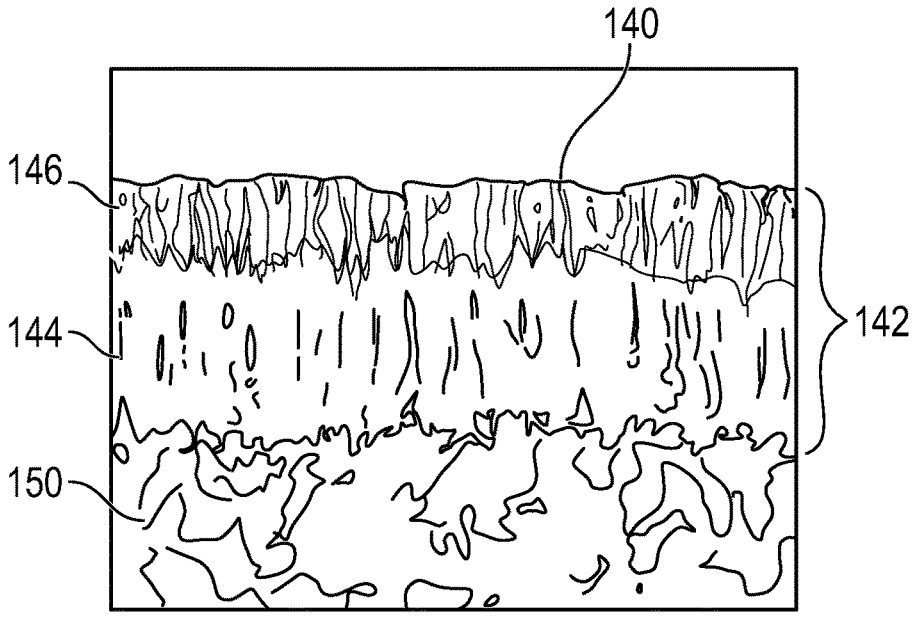
FIG. 5 is an illustration of a cross-section of a braking surface according to an embodiment of the present disclosure.

The braking surfaces 126 in any of the above described embodiments and aspects are boronized, i.e., surface treated with boron, wherein boron atoms are diffused into the surface 140 and subsurface (just below the surface 140) of the rotor body 124 to form an iron boride layer 142 of iron boride phases having the formula $Fe_2B$ ($Fe_2B$ phases) 144 (see FIG. 5) over the iron alloy 150. In embodiments, the only iron boride phases in the iron boride layer is $Fe_2B$ phases. Phases are understood as physically homogenous state of matter, having a certain chemical composition and distinct type of atomic bonding and arrangement of elements. The iron boride layer 142 may also include iron boride having the formula FeB (FeB phases) 146 as illustrated in FIG. 5. Further, if graphite phases are present in the iron alloy, such as in gray cast iron, graphite phases may also be present in the iron boride layer 142. In addition, iron phases, or other phases, may also be present in the iron boride layer, depending on the iron alloy the rotor body 124 is formed from and whether the iron alloy surface was previously treated using one or more of the treatments noted below.

The $Fe_2B$ phases 144 develop first and penetrate deeper in the iron boride layer 142 than the FeB phases 146. Stated another way, when present, at least 60 percent by volume FeB phases are located closer to the surface 140 then $Fe_2B$, which are generally deeper in the iron boride layer 142. The FeB phases 146 are prone to spalling, and the FeB phases 146 may spall off or be removed using a machining process as described further herein.

As previously noted, the rotor body 124, including the braking surface 126, may be treated with other surface treatments including one or more of the following processes: flame hardening, induction hardening, and laser hardening. Additionally or alternatively, the rotor body 124, including the braking surface 126, may be treated by one or more of the following processes: laser clad with an additional iron alloy, austenitic carburizing, nitriding, nitrocarburizing, and ferritic nitrocarburizing. Such treatments may be applied before or after boronizing the breaking surface 126. These treatments may affect the composition of the iron boride layer 142.

Figure 6:
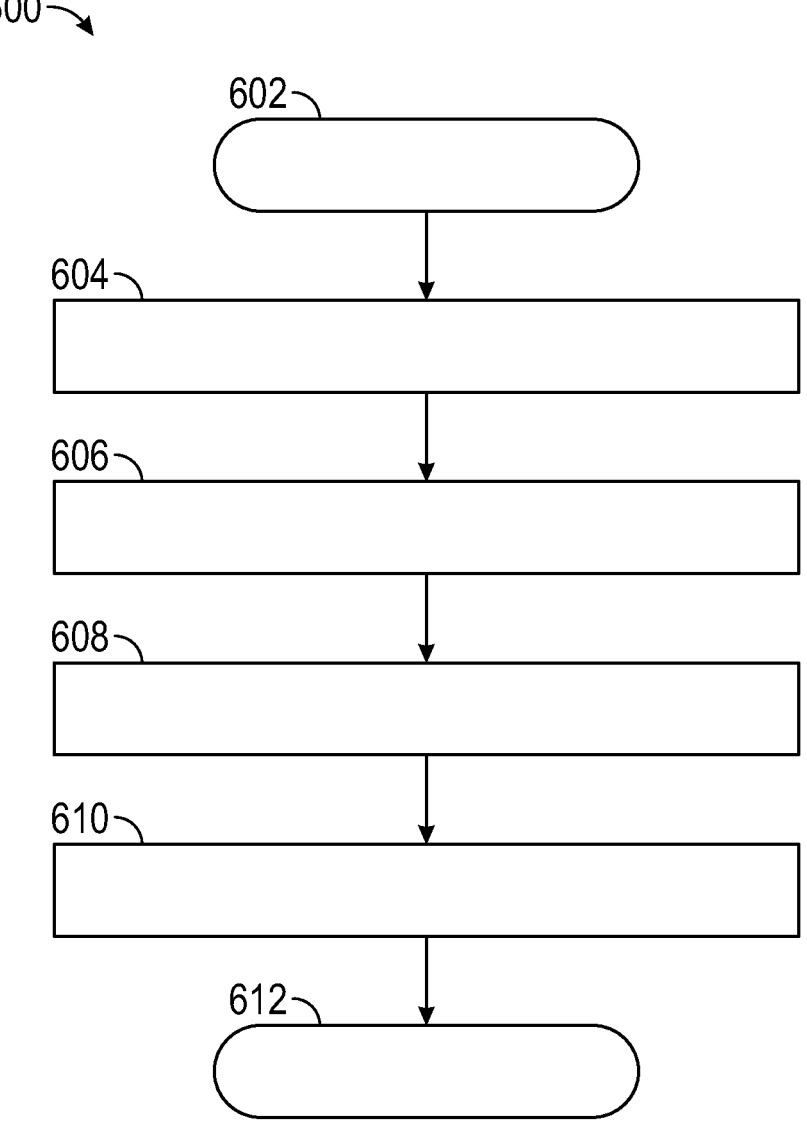
FIG. 6 is a flowchart of a method of boronizing a braking surface of a rotor according to an embodiment of the present disclosure.

FIG. 6 illustrates a method 600 of forming a boronized braking surface 126. Optionally, if not already provided, at block 602 the rotor 120 is formed through a process that may include melting and pouring a molten iron alloy into a mold or using additive manufacturing of an iron alloy feedstock. Once formed, molded-in stresses may be relieved by applying one or more of heat and pressure to the iron alloy.

At block 604 the braking surfaces 126 of the rotor body 124, and optionally the entire rotor body 124, is cleaned to remove contamination such as debris, residue, oil, and oxides that may inhibit the diffusion of boron into the braking surface 126 and the development of iron boride phases in the braking surfaces 126. Cleaning may be facilitated by using at least one of a solvent and water. Additionally, or alternatively, the rotor body 124 may be immersed in an acid bath. In embodiments, the cleaning methods selected do not alter the surface finish of the braking surfaces 126 of the rotor body 124, which may vary from 5 micrometers or less, such as 0.3 micrometers to 2 micrometers.

At block 606, the braking surface 126, and optionally the entire rotor body 124, is boronized. Boronizing may be carried out using at least one of the following treatment processes: boost-diffuse gas boriding, powder pack boriding, and phase homogenization in electrochemical boriding. During boronizing, boron or a boron containing composition is contacted with the iron alloy exposed to a temperature of 700° C. or greater, such as in the range of 750° C. to 1000° C. In an embodiment of boost-diffuse gas boriding, the iron alloy is exposed to a boron containing gas at temperatures in the range of 800° C. to 950° C. This process may also be plasma assisted. In an embodiment of powder pack boriding, an iron alloy is packed in a powder mixture of boron carbide ($B_4C$), an inert filler such as silicon carbide (SiC), and an activator such as potassium tetrafluoroborate ($KBF_4$), and allowed to soak in an inert environment, furnace at a temperature in the range of 950° C. to 1000° C. In an embodiment of phase homogenization in electrochemical boriding, iron alloy is exposed to an electrolyte of molten borax and sodium carbonate at elevated temperatures in the range of 900° C. to 1000° C. It may be appreciated that the boronizing process may be used to relieve stress in the rotor body 124 and the step of relieving stress in the forming process may be omitted.

In the processes described above, $Fe_2B$ phases develop first followed by the FeB phases. Current is applied to the iron alloy for a period of time, usually less than an hour. $Fe_2B$ and, if present, the FeB phases are developed in the iron boride layer 142 formed under the surface 140 of the braking surface 126. Preferably, the process selected is adjusted to limit or prevent FeB phase development. As boronizing processes occur at elevated temperatures, after boronizing at block 604, at block 608 the rotor body 124 is allowed to cool to ambient temperatures, in the range of 18° C. to 30° C., including all values and ranges therein, while holding the rotor body 124 in an environment at a temperature in the range of 18° C. to 30° C. Natural cooling may minimize warpage and distortion of the rotor body 124; however, some distortion may not be prevented.

At block 610, the braking surface 126 is mechanically finished to desired tolerances. Mechanical finishing at this stage may remove all, or at least a portion, of the FeB phases that may be present in the iron boride layer 142 as well as reducing variations that may have been imparted by the boronizing process. In embodiments, the braking surface 126 is mechanically finished to tolerances of +/−0.7 mm or less, including all values and ranges therein such as +/−0.5 mm or +/−0.25 mm, prior to cleaning at block 604 and boronizing at block 606 and then mechanically finished again so as to reduce variations imparted by the boronizing process. Various techniques may be used to mechanically finish the braking surfaces, including one or more of the following: precision milling and grinding, such as double disc grinding. In addition, if not already formed, the rotor body 124 may be drilled or slotted. At block 612, the braking surfaces 126 are finished by polishing the braking surfaces 126.

If other treatments are performed, including one or more of the following processes: flame hardening, induction hardening, laser hardening, laser clad with an additional iron alloy, austenitic carburizing, nitriding, nitrocarburizing, and ferritic nitrocarburizing, the treatments may be applied before or after boronizing the breaking surface 126 at block 604, but prior to the finishing at block 610.

In embodiments, the resulting brake rotor 120 may exhibit an iron boride layer 142 including $Fe_2B$ having a depth in the range of 0.02 millimeters to 2.5 millimeters, including all values and ranges therein. Additional phases present in the iron boride layer may include one or more of iron, graphite, and FeB. Further, the boronized surface of $Fe_2B$ phases may exhibit a hardness that is greater than the underlying iron alloy. The hardness of the braking surfaces may be in the range of 1500 HV to 2000 Vickers Hardness (HV, HV.01) as measured by International Organization for Standardization testing protocol ISO 6507-1:2018; whereas gray cast iron, for example, may exhibit a hardness in the range of 180 HV to 250 HV. In addition, the boronized surface may exhibit greater wear resistance than the underlying iron alloy. The resulting brake rotor 120 may be assembled into vehicle braking system or utilized in other braking applications as noted above.

The boronized brake disc rotor and brake systems of the present disclosure offer several advantages. These advantages include the formation of hardened and wear resistant braking surfaces. Further, the boronizing process may be used to replace the steps used to relieve stresses in casting. An additional advantage is that the braking surfaces of various forms of rotors, such as drum rotors, one-piece disc rotors, or two-piece rotors may be treated using the processes described above.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A brake rotor, comprising:
a rotor body including a braking surface, wherein the rotor body includes an iron alloy including graphite and the braking surface includes a layer of iron boride phases and graphite phases in the braking surface, wherein the iron boride phases have the formula $Fe_2B$.

2. The brake rotor of claim 1, wherein the rotor body includes gray cast iron.

3. The brake rotor of claim 1, wherein the layer further includes iron boride phases having the formula FeB.

4. The brake rotor of claim 1, wherein the braking surface exhibits a hardness in the range of 1500 to 2000 Vickers Hardness (HV).

5. The brake rotor of claim 1, wherein the iron boride phases in the layer consist of $Fe_2B$ phases.

6. The brake rotor of claim 1, wherein the depth of the layer is in the range of 0.02 millimeters to 2.5 millimeters.

7. The brake rotor of claim 1, wherein the rotor body is a disc and includes a central hub and an annulus defined around the central hub, wherein the annulus includes the braking surface.

8. The brake rotor of claim 7, wherein the annulus includes gray cast iron.

9. The brake rotor of claim 8, wherein the central hub is formed from a second material.

10. The brake rotor of claim 1, wherein the layer of iron boride phases and graphite phases further includes iron phases.

11. A vehicle, comprising:
a brake system including a brake rotor including a rotor body including a braking surface, wherein the rotor body includes an iron alloy and graphite, and the braking surface includes a layer of iron boride phases and graphite phases in the braking surface, wherein the iron boride phases have the formula $Fe_2B$; and
a brake pad engageable with the braking surface.

12. The vehicle of claim 11, wherein the layer further includes iron boride having the formula FeB.

13. The vehicle of claim 11, wherein the braking surface exhibits a hardness in the range of 1500 to 2000 Vickers Hardness (HV).

14. The vehicle of claim 13, wherein the iron boride phases in the layer consist of $Fe_2B$ phases.

15. The vehicle of claim 11, wherein the iron alloy includes gray cast iron.

16. The vehicle of claim 11, wherein the rotor body is a disc.

17. The vehicle of claim 11, wherein the layer of iron boride phases and graphite phases further includes iron phases.

18. The vehicle of claim 11, wherein the brake system further comprises:
a brake actuator,
a master cylinder connected to the brake actuator, and
a piston connected to the brake pad and the master cylinder, wherein the piston is connected to the master cylinder with one or more hydraulic lines.

19. A method of forming a brake disc rotor, comprising:
removing contamination from a brake rotor, wherein the brake rotor includes a rotor body including a braking surface, wherein the rotor body includes an iron alloy and graphite;
boronizing the braking surface and forming a layer of iron boride phases and graphite phases on the braking surface wherein the iron boride phases have the formula $Fe_2B$; and
cooling the rotor body to ambient temperature.

20. The method of claim 19, wherein the layer further includes iron boride phases having the formula FeB, and the method further comprises removing the FeB phases from the braking surface.

* * * * *